(12) United States Patent
Fu et al.

(10) Patent No.: US 11,029,206 B2
(45) Date of Patent: Jun. 8, 2021

(54) METHODS AND APPARATUS FOR WAVEGUIDE METROLOGY

(71) Applicant: Applied Materials, Inc., Santa Clara, CA (US)

(72) Inventors: Jinxin Fu, Fremont, CA (US); Rutger Meyer Timmerman Thijssen, San Jose, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/670,976

(22) Filed: Oct. 31, 2019

(65) Prior Publication Data

US 2020/0141802 A1 May 7, 2020

Related U.S. Application Data (60) Provisional application No. 62/772,887, filed on Nov. 29, 2018, provisional application No. 62/756,964, filed on Nov. 7, 2018.

(51) Int. Cl.
*G01J 3/28* (2006.01)
*G06F 3/03* (2006.01)
(Continued)

(52) U.S. Cl.
CPC .............. *G01J 3/2803* (2013.01); *G01J 3/18* (2013.01); *G02B 6/12019* (2013.01);
(Continued)

(58) Field of Classification Search
CPC .... G01J 3/02; G01J 3/28; G01J 3/2803; G01J 3/10; G01J 3/2823
(Continued)

(56) References Cited

U.S. PATENT DOCUMENTS

| 5,359,409 A | 10/1994 | Wildnauer et al. |
| 6,118,119 A | 9/2000 | Ruschin |

(Continued)

FOREIGN PATENT DOCUMENTS

| JP | 2010139483 A | 6/2010 |
| JP | 4976113 B2 | 7/2012 |

(Continued)

OTHER PUBLICATIONS

International Search Report and Written Opinion for Application No. PCT/US2019/058313 dated Feb. 19, 2020.

*Primary Examiner* — Md M Rahman
(74) *Attorney, Agent, or Firm* — Patterson & Sheridan, LLP (57) ABSTRACT

Embodiments described herein relate to apparatus for measuring and characterizing performance of augmented and virtual reality waveguide structures utilizing glass substrates. The waveguide performance measuring systems generally include a light source configured to direct light towards an incoupling grating area on waveguide and one or more light detectors configured to collect light from an outcoupling grating area on a second side of the waveguide. The light source and one or more light detectors are disposed on one or more adjustable stages positioned about the waveguide. In certain embodiments, the one or more adjustable stages are configured to move in a linear fashion or revolve and/or rotate around the waveguide in an orbital motion.

19 Claims, 4 Drawing Sheets

(51) Int. Cl.
  *G02B 6/12* (2006.01)
  *G01J 3/18* (2006.01)
  *H01P 1/16* (2006.01)
  *G06T 19/00* (2011.01)

(52) U.S. Cl.
  CPC .......... *G06F 3/0304* (2013.01); *G06T 19/006* (2013.01); *H01P 1/16* (2013.01)

(58) Field of Classification Search
  USPC ........................................................ 356/326
  See application file for complete search history.

(56) References Cited

U.S. PATENT DOCUMENTS

| | | |
|---|---|---|
| 7,254,290 B1 | 8/2007 | Somerstein et al. |
| 2003/0025899 A1 | 2/2003 | Amara et al. |
| 2012/0038929 A1* | 2/2012 | Den Boef .............. G03F 7/7065 356/456 |
| 2016/0290927 A1* | 10/2016 | Buczkowski ...... G01N 21/6489 |
| 2020/0096315 A1* | 3/2020 | Byrnes ............... G02B 26/0808 |

FOREIGN PATENT DOCUMENTS

| | | |
|---|---|---|
| JP | 5467875 B2 | 4/2014 |
| JP | 2014194473 A | 10/2014 |
| JP | 2015215237 A | 12/2015 |
| JP | 2016125920 A | 7/2016 |
| JP | 2018021761 A | 2/2018 |
| JP | 2018146437 A | 9/2018 |
| KR | 10-20040010091 A | 1/2004 |
| KR | 20130091390 A | 8/2013 |

\* cited by examiner

METHODS AND APPARATUS FOR WAVEGUIDE METROLOGY

CROSS-REFERENCE TO RELATED APPLICATIONS

This application claims benefit of U.S. provisional patent application Ser. No. 62/756,964, filed Nov. 7, 2018, and U.S. provisional patent application Ser. No. 62/772,887, filed Nov. 29, 2018, which are herein incorporated by reference in their entirety.

BACKGROUND

Field

Embodiments of the present disclosure generally relate to waveguides for augmented, virtual, and mixed reality and apparatus for characterization of such waveguides. More specifically, embodiments described herein relate to a metrology apparatus for determining performance efficiency of waveguide combiners.

Description of the Related Art

Virtual reality is generally considered to be a computer generated simulated environment in which a user has an apparent physical presence. A virtual reality experience can be generated in three dimensions (3D) and viewed with a head-mounted display (HMD), such as glasses or other wearable display devices that have near-eye display panels as lenses, to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of or overlaid onto the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is controlling the quality of augmented reality display devices. Many current augmented reality display devices utilize waveguide combiners to assist in overlaying virtual images on ambient environments. Fabricating waveguide combiners can be challenging as waveguides tend to have non-uniform properties, causing light to be propagated differently from one device to another. As such, quality control of waveguide combiners post-fabrication is crucial for maintaining consistent performance between augmented reality display devices. Conventional waveguide metrology systems are utilized in the characterization of and post-fabrication quality control of waveguides. Conventional metrology systems are configured to illuminate and collect light propagation data from a single spot on a waveguide. Light collection from a single spot or region results in an incomplete and inaccurate characterization of waveguide performance as a whole as advanced waveguides often employ complex grating designs and have multiple different regions with different light modulation characteristics.

Accordingly, what is needed in the art are improved methods and apparatus for characterizing waveguide combiner performance.

SUMMARY

In one embodiment, a waveguide metrology system is provided. The waveguide metrology system includes a light source coupled to a first stage, a sample holder coupled to a second stage, and one or more scanning detectors disposed on a third stage. The light source is configured to direct light towards the sample holder. The scanning detectors are disposed orbitally adjacent the sample holder and opposite the light source, and are configured to collect transmissive light. A spectrometer is in communication with the scanning detectors.

In one embodiment, a waveguide metrology system is provided. The waveguide metrology system includes a light source coupled to a first stage, a sample holder coupled to a second stage, one or more scatterometers coupled to a third stage, and one or more reflection detectors coupled to a fourth stage. The light source is configured to transmit light towards the sample holder. The scatterometers are disposed adjacent the sample holder opposite the light source, and are configured to collect light transmitted by the light source. The reflection detectors are configured to collect reflected light. A spectrometer is in communication with the scatterometers and the reflection detectors.

In one embodiment, a waveguide metrology system is provided. The waveguide metrology system includes a white light source coupled to a first stage, a sample holder coupled to a second stage, two or more reflection detectors coupled to a third stage, and two or more transmission detectors coupled to a fourth stage. The white light source is configured to produce a collimated incident light beam. The reflection detectors are configured to collect light reflected from the direction of the sample holder. The transmission detectors are configured to collect light transmitted from the white light source. A spectrometer is in communication with the reflection detectors and the transmission detectors.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to apparatus for measuring and characterizing performance of augmented and virtual reality waveguide structures utilizing glass substrates. The waveguide performance measuring systems include a light source configured to direct light towards an incoupling grating area on a first side of a waveguide and one or more light detectors configured to collect light from an outcoupling grating area on a second side of the waveguide. The light source and one or more light detectors are disposed on one or more adjustable stages positioned about the waveguide. In certain embodiments, the one or more adjustable stages are configured to move in a linear fashion or rotate and/or revolve about the waveguide in an orbital motion.

Figure 1A:
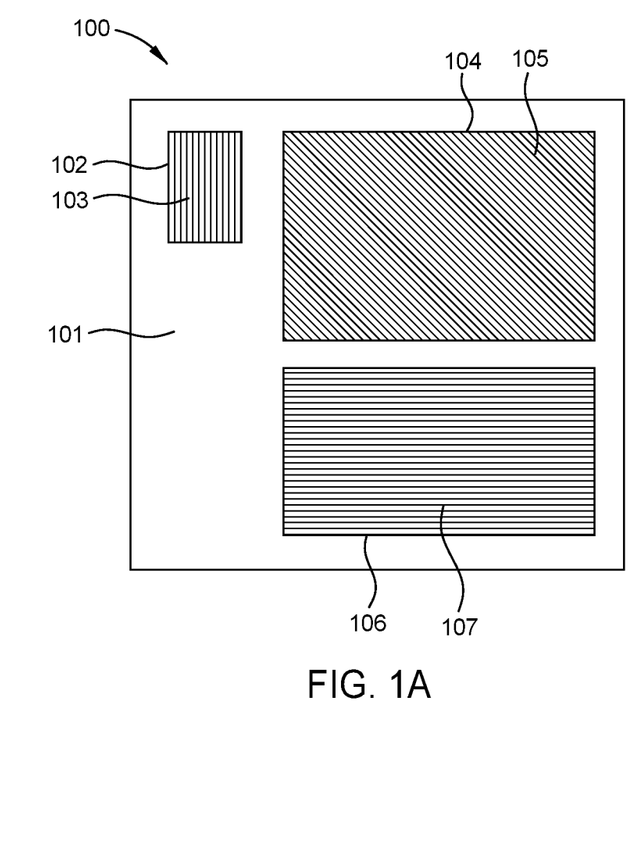
FIG. 1A illustrates a schematic, side view of a waveguide combiner according to an embodiment of the disclosure.
Figure 1B:
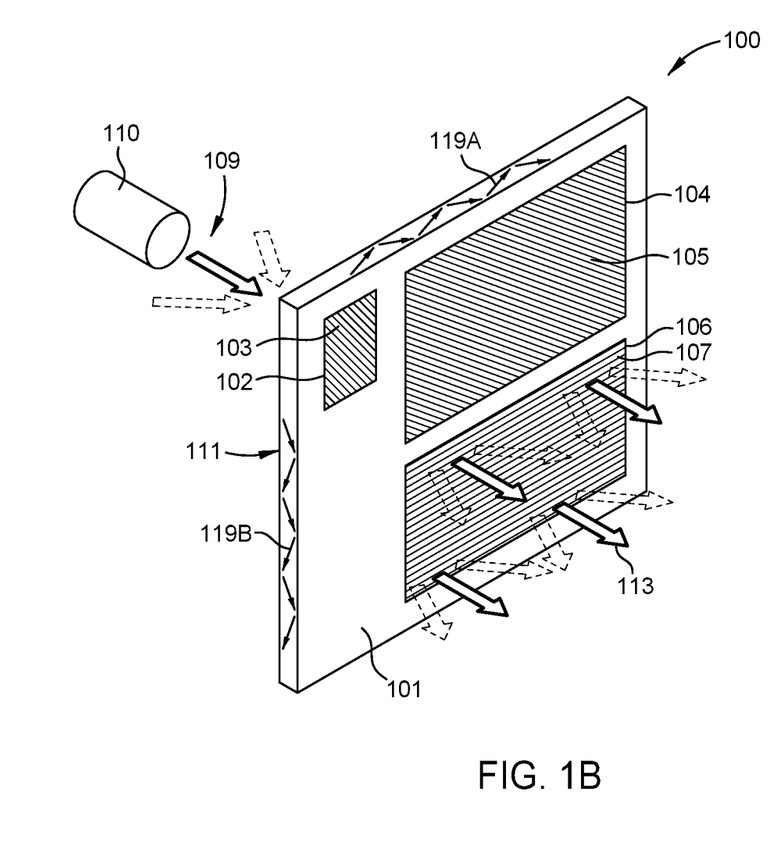
FIG. 1B illustrates a schematic, perspective view of the waveguide combiner of FIG. 1A according to an embodiment described herein.

FIGS. 1A-1B illustrate schematic views of a waveguide combiner 100 (e.g. for VR or AR applications) having three pluralities of gratings 103, 105, and 107. It is to be understood that the waveguide combiner 100 described below is an exemplary waveguide combiner, and that other waveguide combiners may be used with or modified to accomplish aspects of the present disclosure. For example, a waveguide combiner having more than three pluralities of gratings may be used, such as five or more pluralities of gratings. Alternatively, a waveguide combiner having less than three pluralities of gratings may be used, such as two pluralities of gratings. In another example, a waveguide combiner having gratings on both major planar sides may be used. In yet another example, a waveguide combiner having more than one input coupling region and more than one output coupling region may be used.

FIG. 1A illustrates a side view of a first side 101 of the waveguide combiner 100. The waveguide combiner 100 includes an input coupling region 102 defined by the first plurality of gratings 103, an intermediate region 104 defined by the second plurality of gratings 105, and an output coupling region 106 defined by the third plurality of gratings 107. In some embodiments, the input coupling region 102, intermediate region 104, and output coupling region 106 are arranged so as to achieve substantially total internal reflection of light between the input coupling region 102 and the output coupling region 106.

While operating within a display device, the input coupling region 102 receives incident beams of light (shown in FIG. 1B) having an intensity from a microdisplay (not shown). Each grating of the plurality of gratings 103 is angled relative to a planar face of the waveguide combiner 100, such as the first side 101. In one embodiment, the plurality of gratings 103 splits the incident beams into a plurality of reflective and transmissive diffraction orders, for example, a zero-order mode, a positive first-order mode, or a negative first-order mode. In one embodiment, the zero-order transmissive mode beams are refracted in and out of the waveguide combiner 100 and eventually lost in the background. The positive first-order mode beams are coupled through the waveguide combiner 100 to the intermediate region 104 by total internal reflection, and the negative first-order mode beams are propagated in the waveguide combiner 100 in a direction opposite to the positive first-order beams.

FIG. 1B illustrates a perspective view of the waveguide combiner 100 depicting the travel path of incident light beams 109 within the waveguide combiner 100. The waveguide combiner 100 has a first planar side 101 and a second planar side 111 arranged in parallel to enable propagation of light within the internal dimensions of the waveguide combiner 100. The waveguide combiner 100 is fabricated from an optically transparent material configured to enable a user to see through major planar sides 101, 111 of the waveguide combiner 100.

In one embodiment, the incident light beams 109 produced by a light source 110 are directed towards the first plurality of gratings 103 defining the input coupling region 102. Each grating of the first plurality of gratings 103 is angled relative to a planar face (i.e. planar side) of waveguide combiner 100 to enhance desired diffraction orders of light within the waveguide combiner 100. In one embodiment, each grating of the first plurality of gratings 103 is angled such that positive first-order mode beams are reflected within the waveguide combiner 100. For example, each grating of the first plurality of gratings 103 is angled to suppress zero-order mode beams and negative first-order mode beams.

After contacting the first plurality of gratings 103, desired beam modes from the incident light beams 109 are split and reflected internally within the waveguide combiner 100 toward the intermediate region 104. Light paths 119A, 119B are the propagation paths (e.g. projections) of the light beams 109 inside the waveguide combiner 100. The light beams 109 undergo total internal reflection (TIR) as they are propagated through the intermediate region 104 and make contact with the second plurality of gratings 105. Similar to the first plurality of gratings 103, each grating of the second plurality of gratings 105 is angled relative to a planar face of the waveguide combiner 100 to reflect desired beams of light within the waveguide combiner 100. In one embodiment, each grating of the second plurality of gratings 105 is angled such that positive first-order mode beams are reflected within the waveguide combiner 100. For example, each grating of the second plurality of gratings 105 is angled to suppress zero-order mode beams. In one embodiment, each grating of the second plurality of gratings 105 is angled to reflect positive first-order mode beams towards the output coupling region 106 while suppressing zero-order mode beams.

The desired beams reflected by the second plurality of gratings 105 are then directed to a third plurality of gratings 107 within the output coupling region 106. Similar to the first plurality of gratings 103 and second plurality of gratings 105, the third plurality of gratings 107 splits and propagates desired beam modes 113 out of the waveguide combiner 100 from the first side 101 in order to couple the beams with ambient light from the surrounding environment on an image plane. Typically, the image plane is at a focal point distanced apart from the waveguide combiner 100.

Figure 2A:
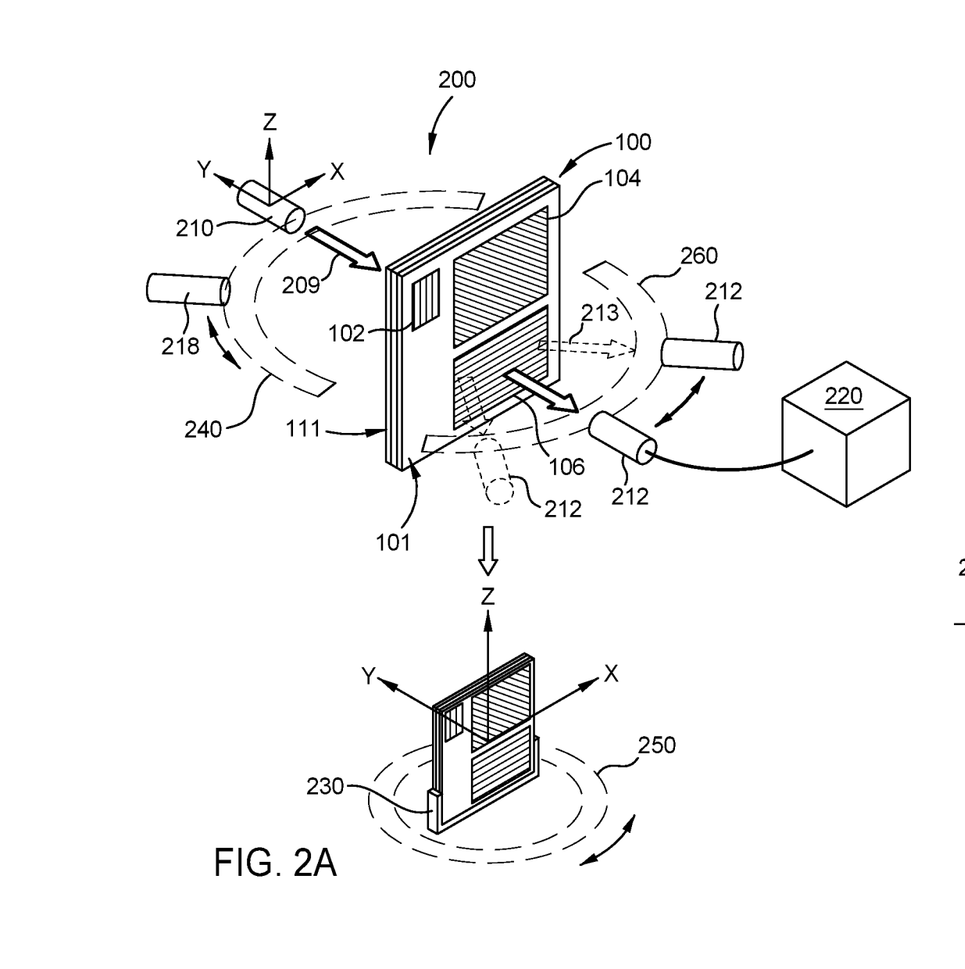
FIG. 2A illustrates a schematic, perspective view of a waveguide metrology system according to an embodiment of the disclosure.
Figure 2B:
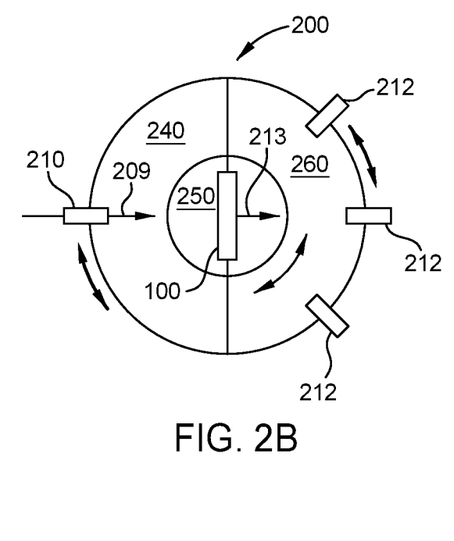
FIG. 2B illustrates a schematic, plan view of the metrology system of FIG. 2A according to an embodiment of the disclosure.

FIGS. 2A-2B illustrate schematic views of a waveguide metrology system 200 according to an embodiment of the disclosure. FIG. 2A illustrates a perspective view of the waveguide metrology system 200. FIG. 2B illustrates a top-down view of the waveguide metrology system 200.

Accordingly, FIGS. 2A and 2B are discussed simultaneously in order to facilitate understanding of the disclosure. For reference, x, y, and z axis frames are illustrated in FIG. 2A. The y axis is perpendicular to the planar sides 101, 111 of the waveguide combiner 100. The z axis is parallel to the planar sides 101, 111 of the waveguide combiner 100 in a vertical orientation. The x axis is parallel to the planar sides 101, 111 of the waveguide combiner in a horizontal orientation.

The metrology system 200 includes a light source 210, a sample holder 230, and one or more light detectors 212. Examples of suitable light detectors include optical sensors, active-pixel sensors (APSs), charge-coupled devices (CCD), photoresistors, photodiodes, semiconductor detectors, and the like. The light source 210 is disposed on a first stage 240 adjacent the planar side 111 and is configured to produce and direct an incident light beam 209 towards the input coupling region 102 of the waveguide combiner 100. Any suitable type of light may be used for metrology system 200, including but not limited to a white light source, a light engine image generator, a laser, or a light emitting diode (LED). In one embodiment, the light source 210 includes a collimating device (not shown). In some examples, the light source 210 directs collimated light towards the input coupling region 102 of the waveguide combiner 100. In other examples, the light source 210 directs non-collimated or diffuse light towards the input coupling region 102 of the waveguide combiner 100.

In one embodiment, the first stage 240 further includes one or more reflection detectors 218 disposed thereon. Examples of suitable reflection detectors include optical sensors, active-pixel sensors (APSs), charge-coupled devices (CCD), photoresistors, photodiodes, semiconductor detectors, and the like. The reflection detectors 218 are configured to detect and collect any light beams reflected or refracted from the planar side 111 and not internally transmitted through the waveguide combiner 100. The one or more reflection detectors 218 and the light source 210 may be arranged in any suitable quantity and configuration on the first stage 240. For example, two reflection detectors 218 and a single light source 210 may be arranged in a linear configuration or a crescent-like configuration, one reflection detector 218 on each peripheral side of the light source 210. Further, the reflection detectors 218 may each be oriented at an angle in relation to the central light source 210 and a focal point of the reflection detectors 218 and light source 210. Alternatively, a single reflection detector 218 may be disposed on the first stage 240. In some embodiments, the first stage 240 includes one or more scanning arms configured to actuate the first stage 240, and thus the single reflection detector 218, enabling the collection of light reflected at different angles with a single reflection detector 218 and eliminating utilization of multiple detectors disposed at different locations and/or angles.

The first stage 240 is linearly adjustable about the x, y, and z axes so that the light source 210 and/or reflection detectors 218 may be moved in both a vertical and horizontal direction in relation the waveguide combiner 100. For example, the first stage 240 may include several guide members extending in the x-, y-, and z-directions upon which the first stage 240 may be moved. In another example, the first stage 240 may be coupled to a scanning arm configured to linearly move along the x, y, and z axes. In yet another example, the first stage 240 may be disposed on a rolling platform configured to linearly move along the x, y, and z axes.

The first stage 240 is further configured to rotate about the z axis through a point of the first stage 240. For example, the first stage 240 rotates from about 1 degree to about 360 degrees about the z axis through the first stage 240. In some embodiments, the first stage 240 is also configured to revolve (e.g. orbit, gyrate) around the waveguide combiner 100 between about 1 degree to about 180 degrees on the planar side 111 thereof. For example, the first stage 240 is configured to revolve about 180 degrees around the waveguide combiner 100 and about the z axis in a clockwise or counterclockwise direction. The combination of linear, rotational, and revolutionary adjustability of the first stage 240 enables the light source 210 to direct the incident light beam 209 towards the input coupling region 102 at different angles and across different distances from the waveguide combiner 100. Additionally, the combination of linear, rotational, and revolutionary adjustability of the first stage 240 enables the reflection detectors 218 to measure reflected beams at different angles and distances.

It is to be noted that the first stage 240, as well as any other stages described herein, may include one or more movable (e.g. manipulable) support structures for supporting one or more light sources and/or detectors thereon. For example, in some embodiments, the stages described herein may include one or more movable platforms, stands, articulated arms, scanning arms, guides, rails, tracks, and the like.

The sample holder 230 is disposed on a second stage 250 and is configured to secure a sample (e.g., the waveguide combiner 100) for analysis. Similar to the first stage 240, the second stage 250 is linearly adjustable about an x, y, and z axes so that the waveguide combiner 100 may be moved in both a vertical and horizontal direction. For example, the second stage 250 may include several guide members extending in the x, y, and z axes upon which the second stage 250 may be moved. In another example, the second stage may be coupled to an adjustable scanning arm configured to linearly move the second stage 250 in the x, y, and z axes. In yet another example, the second stage 250 may be disposed on a rolling platform configured to linearly move along the x, y, and z axes.

The second stage 250 is further configured to rotate 360 degrees about the z axis through a central point of the stage. For example, the second stage 250 is rotated about the z axis in a clockwise or counterclockwise direction. The combination of linear and rotational adjustability of the second stage 250 enables the waveguide combiner 100 to incouple and outcouple light at a range of horizontal and vertical angles relative to the light source 210, reflection detectors 218, and light detectors 212. The capability to measure light incoupled and outcoupled at different angles enables more precise measurement of the grating characteristics of the waveguide combiner 100 from which the patterning or etching of those gratings may be improved. In certain embodiments, a prism (not shown) is mounted onto the waveguide combiner 100 while secured on the second stage 250 to couple light into the input coupling region 102 or out of the output coupling region 106. In such embodiments, a refractive index matching fluid is used as an intermediate between the waveguide combiner 100 and the prism to prevent unwanted reflection and refraction of the incoupling and outcoupling light. Examples of refractive index matching fluids that can be utilized herewith include silica-based matching liquids, oils, and gels.

The one or more light detectors 212 are disposed on a third stage 260 adjacent the planar side 101 and opposite the second stage 240 and light source 210. The light detectors 212 are arranged in any suitable quantity and configuration on the third stage 260. For example, three light detectors 212 are arranged in a crescent-like configuration, the distal light detectors each positioned at an angle of about 45 degrees in relation to a central detector and around a focal point of the three light detectors 212. In another embodiment, three light detectors 212 are arranged in a linear configuration, equally spaced from one another on the third stage 260. Alternatively, a single light detector 212 may be disposed on the third stage 260. The third stage 260 may be coupled to a scanning arm, thus enabling the collection of light diffracted at different angles by a single light detector 212 and eliminating utilization of multiple detectors.

The third stage 260 is configured to revolve around the waveguide combiner 100 between about 1 degree to about 180 degrees on the planar side 101 thereof. For example, the third stage 260 is configured to revolve about 180 degrees around the waveguide combiner 100 and about the z axis in a clockwise or counterclockwise direction. The revolutionary adjustability of the third stage 260 enables the light detectors 212 to measure the transmission light beams 213 exiting the output coupling region 106 at different angles in relation to the waveguide combiner 100.

In the embodiment illustrated in FIG. 2A, the light detectors 212 are further coupled to a spectrometer 220, although any suitable light metrology system may be used in characterizing waveguide combiner performance. The light detectors 212 may further include any suitable kind of light sensor, including but not limited to scanning scatterometers or conoscopic scatterometers. The light detectors 212 are configured to detect and collect transmission light beams 213 propagated from the output coupling region 106 of the waveguide combiner 100.

In measuring the performance characteristics of the waveguide combiner 100, light scattering data is collected by the reflection detectors 218 and light detectors 212 and relayed to the spectrometer 220 for data analysis. Upon analysis by the spectrometer 220, results are relayed to and displayed on a graphical user interface (GUI) (not shown). In one embodiment, performance characteristics of the sample waveguide combiner 100 are displayed as a two-dimensional grid corresponding to one of the planar sides 101, 111 of the waveguide combiner 100.

The adjustability of the stages 240, 250, 260 and the quantity of detectors 212, 218 utilized in metrology system 200 enables a user to more accurately measure a wide range of performance characteristics of the waveguide combiner 100. In one embodiment, the metrology system 200 is configured to measure and analyze a reflective diffraction efficiency of the waveguide combiner 100. In another embodiment, the metrology system 200 is configured to measure and analyze the transmissive diffraction efficiency of the waveguide combiner 100.

Figure 3A:
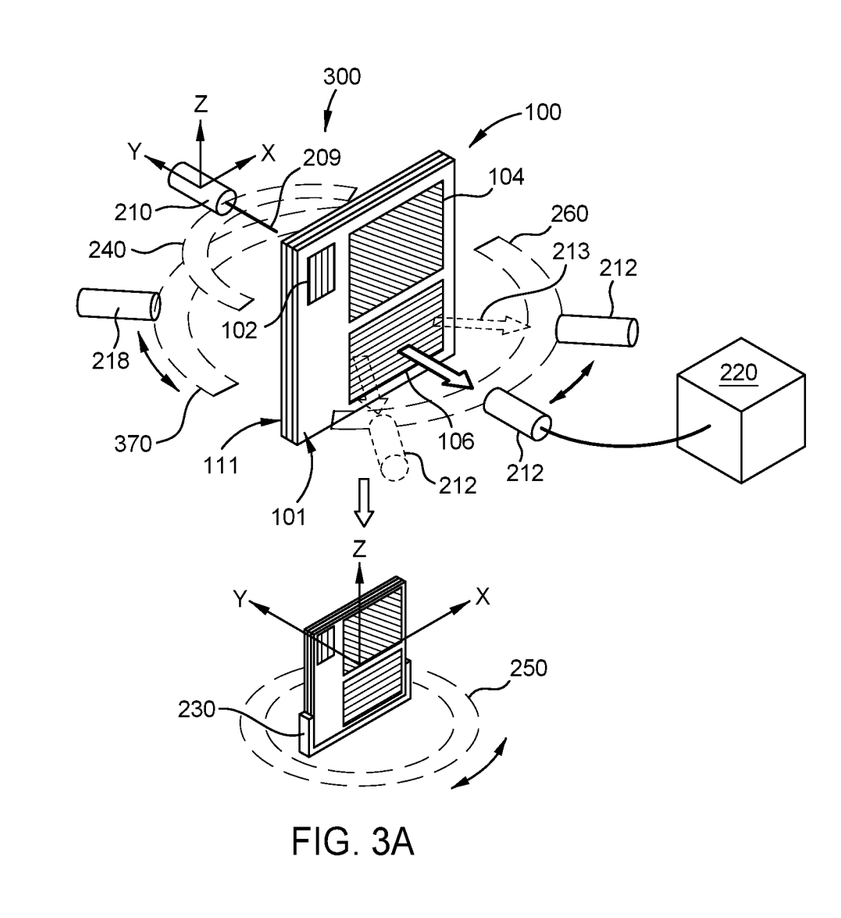
FIG. 3A illustrates a schematic, perspective view of a waveguide metrology system according to an embodiment of the disclosure.
Figure 3B:
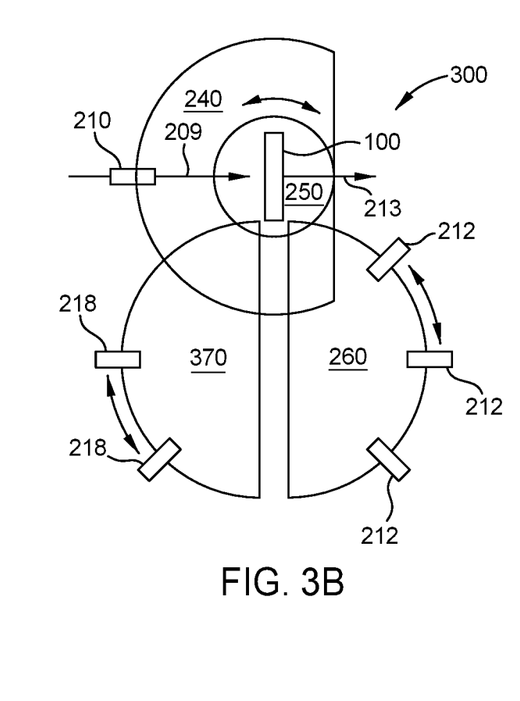
FIG. 3B illustrates a schematic, plan view of the metrology system of FIG. 3A according to an embodiment of the disclosure.

FIGS. 3A-3B illustrate schematic views of a metrology system 300 according to an embodiment of the disclosure. FIG. 3A illustrates a perspective view of the waveguide metrology system 300. FIG. 3B illustrates a top-down view of the waveguide metrology system 300 with stages 240, 250 offset from stages 260, 370 for purposes of clarity. Accordingly, FIGS. 3A and 3B are discussed simultaneously in order to facilitate understanding of the disclosure. For reference, x, y, and z axis frames are illustrated in FIG. 3A, having substantially similar orientations to FIG. 2A.

The metrology system 300 is similar in configuration to metrology system 200. However, unlike in metrology system 200, the one or more reflection detectors 218 of metrology system 300 are disposed on a fourth stage 370 adjacent the planar side 111 of the waveguide combiner 100. The fourth stage 370 is configured to revolve around the waveguide combiner 100 between about 1 degree to about 180 degrees on the planar side 111 thereof, similar to the third stage 260. For example, the fourth stage 370 is configured to revolve about 180 degrees around the waveguide combiner 100 and about the z axis in a clockwise or counterclockwise direction. The revolutionary adjustability of the fourth stage 370 enables the reflection detectors 218 to measure reflected beams at different angles in relation to the waveguide combiner 100.

The one or more reflection detectors 218 may be arranged in any suitable quantity and configuration on the fourth stage 370. For example, three reflection detectors 218 may be arranged in a linear or crescent-like configuration. The distal reflection detectors may each be oriented at an angle 45 degrees in relation to the central reflection detector around a focal point of the three reflection detectors 218. Alternatively, in another embodiment, a single reflection detector 218 may be disposed on the fourth stage 370. The fourth stage 370 may be coupled to a scanning arm, thus enabling the collection of light reflected at different angles by a single reflection detector 218 and eliminating utilization of multiple detectors.

The addition of the fourth stage 370 with one or more reflection detectors 218 coupled thereto enables the metrology system 300 to perform additional types of performance characteristic analyses of the waveguide combiner 100 as compared to the metrology system 200. For example, the addition of the fourth stage 370 enables the metrology system 300 to measure field of view characteristics, as well as the overall coupling efficiency of the waveguide combiner 100. In one embodiment, the first stage 240 and the second stage 250 are synchronized to be spatially adjusted simultaneously. Simultaneous adjustment of the spatial position and orientation of the first and second stages 240, 250 enables the metrology system 300 to also measure angular uniformity and spatial uniformity of the waveguide combiner 100. In another embodiment, the metrology system is further configured to measure the color uniformity of the waveguide combiner 100. In yet another embodiment, the metrology system 300 utilizes a light engine as a light source 210 and is configured to measure image resolution and contrast characteristics of the waveguide combiner 100.

Figure 4A:
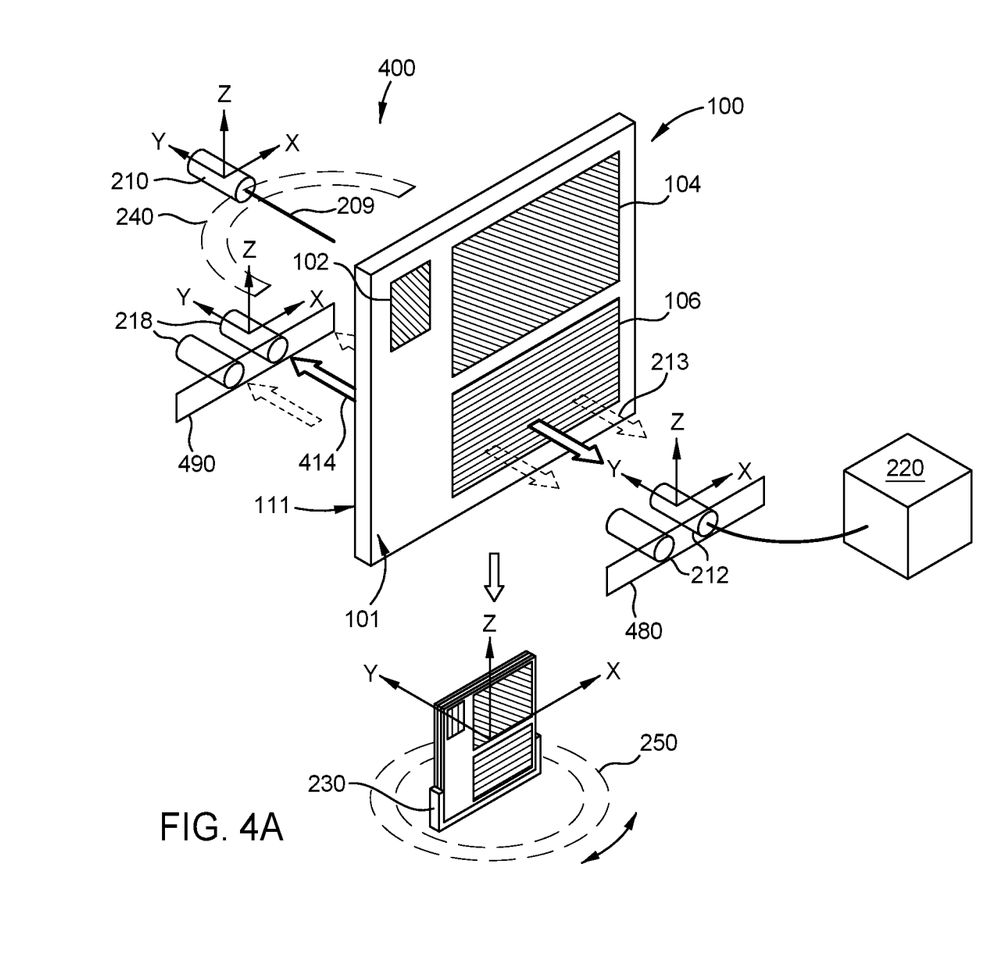
FIG. 4A illustrates a schematic, perspective view of a waveguide metrology system according to an embodiment of the disclosure.
Figure 4B:
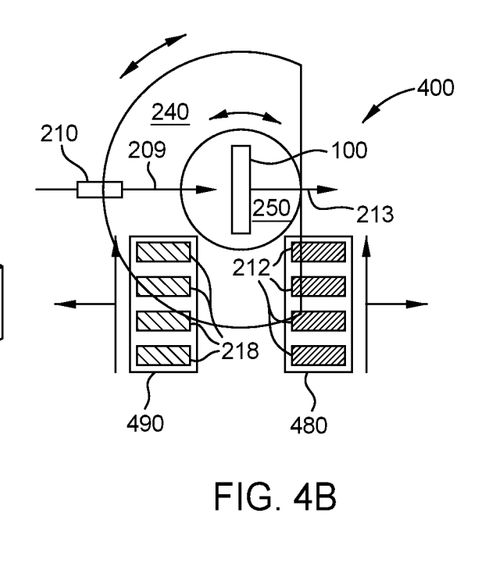
FIG. 4B illustrates a schematic, plan view of the metrology system of FIG. 4A according to an embodiment of the disclosure.

FIGS. 4A-4B illustrate schematic, perspective views of a metrology system 400 according to an embodiment of the disclosure. FIG. 4A illustrates a perspective view of the waveguide metrology system 400 and FIG. 4B illustrates a top-down view of the waveguide metrology system 400 with stages 240 and 250 offset from stages 480 and 490 for purposes of clarity. Accordingly, FIGS. 4A and 4B are discussed simultaneously in order to facilitate understanding of the disclosure. For reference, x, y, and z axes frames are illustrated in FIG. 4A, having substantially similar orientations to FIG. 2A.

The metrology system 400 is similar in configuration to metrology system 300. However, unlike in metrology system 300, the third stage 260 and the fourth stage 370 are replaced with a fifth stage 480 and a sixth stage 490. The fifth stage 480 and the sixth stage 490 are disposed opposite one another, each facing a different planar side of the waveguide combiner 100. In one embodiment, the fifth stage 480 is disposed adjacent the planar side 111 and the sixth stage 490 is disposed adjacent to planar side 101.

Further, the fifth stage 480 and sixth stage 490 are linearly adjustable about the x, y, and z axes. For example, the fifth stage 480 and sixth stage 490 may include several guide members extending in the x, y, and z directions upon which the stages may be moved. In another example, the fifth stage 480 and sixth stage 490 may be coupled to adjustable scanning arms configured to linearly move the stages along the x, y, and z axes. In yet another example, the fifth stage 480 and the sixth stage 490 may be disposed on rolling platforms configured to linearly move along the x, y, and z axes. The linear adjustability of the fifth stage 480 and the sixth stage 490 enables the reflection detectors 218 and the light detectors 212 to measure reflected and transmissive light beams at different vertical and horizontal angles and distances.

The one or more light detectors 212 are disposed on the fifth stage 480. The light detectors 212 may be arranged in any suitable quantity and configuration on the fifth stage 480. For example, three light detectors 212 may be arranged in a linear or crescent-like configuration. Further, the distal light detectors may each be positioned at an angle in relation to a central light detector around a focal point of the three light detectors 218. Alternatively, in another embodiment, a single light detector 212 may be disposed on the fifth stage 480. The fifth stage 480 may be coupled to a scanning arm, thus enabling the collection of light diffracted at different angles by a single light detector 212 and eliminating utilization of multiple detectors.

Similarly, the one or more reflection detectors 218 are disposed on the sixth stage 490 and may be arranged in any suitable quantity and configuration on the sixth stage 490. For example, three reflection detectors 218 may be arranged in a linear or crescent-like configuration, the distal reflection detectors each positioned at an angle in relation to a central reflection detector around a focal point of the three reflection detectors 218. Alternatively, in another embodiment, a single reflection detector 218 may be disposed on the sixth stage 490. The sixth stage 490 may be coupled to a scanning arm, thus enabling the collection of light reflected at different angles by a single reflection detector 218 and eliminating utilization of multiple detectors.

By utilizing the fifth stage 480 and sixth stage 490 in place of the third stage 260 and fourth stage 370, the metrology system 400 is capable of performing additional forms of characteristic analyses of the waveguide combiner 100 beyond those of the metrology systems 200, 300. For example, by detecting the convergence of the transmission light beams 213 or reflection beams 414 with the light detectors 212 or the reflection detectors 218, the metrology system 400 can measure the overall optical power of the waveguide combiner 100. In another example, by moving the fifth stage 480 along the x, y, and z axes and measuring the light beams 213 at multiple positions with the light detectors 212, the metrology system 400 can measure the spatial uniformity of the waveguide combiner 100 at different angles. In yet another example, by utilizing a collimated light source 210 which produces a collimated incident light beam 209, the metrology system 400 can measure the entrance and exit pupil size, thus determining pupil replication characteristics of the waveguide combiner 100.

In summation, an adjustable and flexible metrology system for measuring waveguide combiner performance is described herein. Waveguide combiners have non-uniform properties throughout and utilize multiple diffraction gratings to refract and reflect light beams. The utilization of multiple translation, revolution, and/or rotation stages, as well as multiple light detectors, enables the metrology system to collect data at a wider range of locations and angles. Thus, metrology systems utilizing multiple translation and rotation stages, as well as multiple light detectors, provide for improved waveguide combiner characterization which enables improved quality control in the fabrication of waveguide combiners.

While the foregoing is directed to embodiments of the present disclosure, other and further embodiments of the disclosure may be devised without departing from the basic scope thereof, and the scope thereof is determined by the claims that follow.

What is claimed is:

1. A waveguide metrology system, comprising:
  a light source coupled to a first stage and configured to direct light towards a sample waveguide holder disposed on a second stage, the light source disposed on a first side of the second stage;
  one or more scanning detectors coupled to a third stage on a second side of the second stage opposite the first side, the one or more scanning detectors configured to collect light transmitted in a first direction from the sample waveguide holder towards the second side;
  a reflection detector coupled to a fourth stage on the first side of the second stage, the reflection detector configured to collect light reflected in a second direction from the sample waveguide holder towards the first side; and
  a spectrometer in communication with the one or more scanning detectors, wherein the system is configured to measure reflective and transmissive light diffraction efficiency characteristics of a sample waveguide in the sample waveguide holder.

2. The metrology system of claim 1, wherein the first stage is configured to move linearly about an x, y, or z axis.

3. The metrology system of claim 1, wherein the first stage is further configured to revolve up to about 180° around the second stage separate from any rotation by the second stage.

4. The metrology system of claim 1, wherein the second stage is configured to rotate about a vertical axis.

5. The metrology system of claim 1, further comprising:
  a reflection detector disposed on the first stage adjacent to the light source.

6. A waveguide metrology system, comprising:
  a light source coupled to a movable first stage and configured to transmit light towards a sample waveguide holder disposed on a second stage, the light source disposed on a first side of the second stage;
  one or more scatterometers coupled to a movable third stage on a second side of the second stage opposite the first side, the third stage separately movable from the first stage, the one or more scatterometers configured to collect light transmitted in a first direction from the sample waveguide holder towards the second side;
  one or more reflection detectors coupled to a movable fourth stage on the first side of the second stage, the fourth stage separately movable from the first stage and the third stage, the reflection detectors configured to collect light reflected in a second direction of from the sample waveguide holder towards the first side; and
  a spectrometer in communication with the one or more scatterometers and the one or more reflection detectors, wherein the system is configured to measure reflective and transmissive light diffraction efficiency characteristics of a sample waveguide in the sample waveguide holder.

7. The metrology system of claim 6, wherein the first stage is configured to move linearly about an x, y, and z axis.

8. The metrology system of claim 7, wherein the first stage is further configured to revolve up to about 180° around the sample waveguide holder separate from any rotation by the second stage.

9. The metrology system of claim 6, wherein the second stage is configured to move linearly about an x, y, and z axis.

10. The metrology system of claim 9, wherein the second stage is further configured to rotate about the z axis.

11. The metrology system of claim 6, wherein the third stage and the fourth stage are configured to revolve up to about 180° around the sample waveguide holder separate from any rotation by the second stage.

12. The metrology system of claim 6, wherein the first stage and the second stage are synchronized to measure angular and spatial uniformity characteristics of a sample waveguide.

13. The metrology system of claim 6, wherein the system is configured to measure field of view and light coupling efficiency characteristics of a sample waveguide.

14. The metrology system of claim 6, wherein the system is configured to measure color uniformity characteristics of a sample waveguide.

15. The metrology system of claim 6, where in the light source is a light engine and the system is configured to measure image resolution and contrast characteristics of a sample waveguide.

16. A waveguide metrology system, comprising:
   a collimated light source coupled to a first movable stage;
   a sample waveguide holder disposed on a second movable stage;
   a reflection detector coupled to a third movable stage on a first side of the sample waveguide holder and configured to collect light reflected in a first direction from the sample waveguide holder;
   a transmission detector coupled to a fourth movable stage on a second side of the sample waveguide holder and configured to collect light transmitted in a second direction from the sample waveguide holder, wherein the first stage, the third stage, and the fourth stage are configured to revolve up to about 180° around the sample waveguide holder separate from any rotation by the second stage; and
   a spectrometer in communication with the reflection detector and the transmission detector, wherein the system is configured to measure reflective and transmissive light diffraction efficiency characteristics of a sample waveguide in the sample waveguide holder.

17. The metrology system of claim 16, wherein the first stage and the second stage are configured to move linearly about an x, y, and z axis and rotate about the z axis.

18. The metrology system of claim 16, wherein the third stage and the fourth stage are configured to move linearly about an x, y, and z axis.

19. The metrology system of claim 16, wherein the light source comprises a white light source, a laser, or a light emitting diode.

* * * * *